Figure 1:
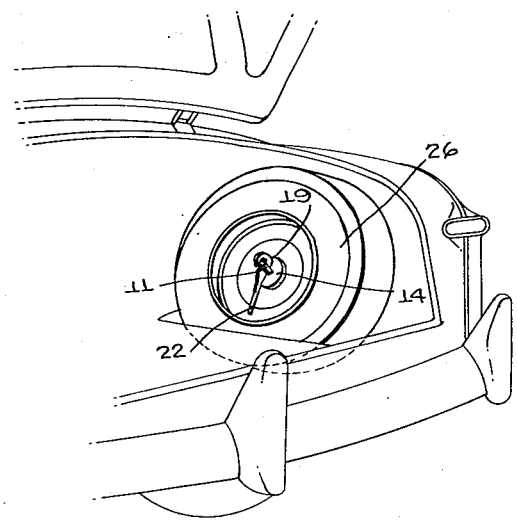

June 25, 1957   R. D. GEIGER   2,797,036
LOCK MECHANISM FOR A SPARE TIRE
Filed Aug. 13, 1954

INVENTOR.
RAYMOND D. GEIGER
BY
McMorrow, Berman + Davidson
ATTORNEYS

United States Patent Office 2,797,036
Patented June 25, 1957

2,797,036

LOCK MECHANISM FOR A SPARE TIRE

Raymond D. Geiger, Castle Rock, Wash.

Application August 13, 1954, Serial No. 449,617

2 Claims. (Cl. 224—42.24)

The present invention relates generally to motor vehicles and specifically to a device by means of which a spare tire is secured quickly and easily to a frame member of the automobile.

Presently in use are various means and arrangements of bolts and locks by which a spare tire is secured to an automobile. Some makers of automobiles provide stud bolts secured at one end in an upright frame piece, with accompanying nuts for each bolt; the spare tire, mounted on a wheel as is the practice, must be lifted and placed with the holes in the wheel over the stud bolts. This necessitates lifting the wheel and tire several times until the holes in the wheel hub plate coincide with the stud bolt or bolts provided in the frame piece. Another and more frequently used method in some makes of automobiles is to provide a single central stud bolt and a special plate to fit over the hub and a nut to hold the plate in place. Other methods include special stud bolts which have to be removed from the hole provided before the tire can be lifted.

Frequently, with the spare tire located at the rear of the automobile and with the rear bumper in the way, this moving of the tire to align the hub plate holes with the stud bolts is arduous and laborious for the automobile driver, and is nearly impossible for frail and slight persons.

Another cause for annoyance in the use of the stud bolt method of securing the spare tire in its well or to its bracket within the rear trunk compartment is that the stud bolt or bolts are provided with nuts which are of the same size as the lug nuts on the wheels, and most automobile owners and mechanics who change tires provide themselves with lug nut wrenches having an X shape, with four relatively long legs each ending in a socket for one size nut. When the spare tire is in a well on the rear end of the car or within the trunk compartment, all too often other parts of the car or baggage and tools within the trunk compartment interfere with the free twisting movement of the lug wrench. Other wrenches must be found and used, and barked knuckles frequently are received in the process of removing the nut from the stud bolt, usually rusted from disuse.

Another and more frequently used method in some makes of automobiles is to provide a single central stud bolt and a special plate to fit over the hub and a nut to hold the plate in place. Other methods include special stud bolts which have to be removed from the hole provided before the tire can be lifted.

The present invention has for its principal object therefore, to provide a device for locking the spare tire to its mounting bracket or to the automobile frame where it is stored.

Another object of the present invention is to provide a device which is readily attached to the bracket and supplants the usual stud bolt provided by the manufacturer.

A further object of the present invention is to provide a device which is inexpensive to manufacture on ordinary forming tools and one which requires no special tools for installing in the automobile, nor requires any alterations in the frame piece or bracket provided.

Figure 2:
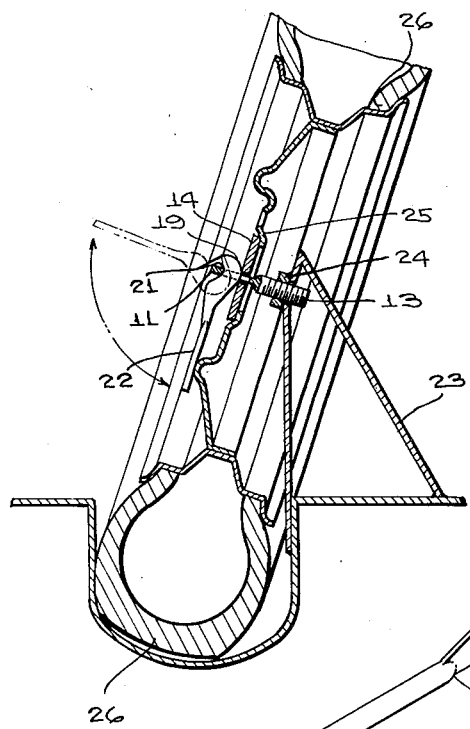
Figure 3:
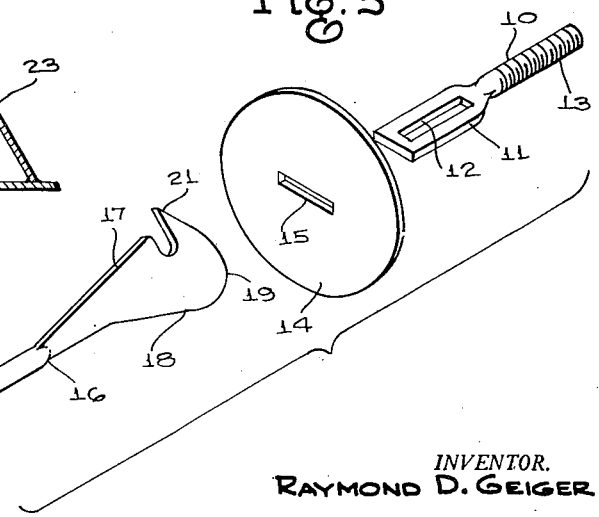

These and other objects and advantages of the present invention will be readily apparent from the following description when considered in connection with the annexed drawings, in which:

Figure 1 is a view in perspective of a wheel and tire as positioned on a bracket within the trunk compartment, with the present invention in place, Figure 2 is a cross sectional side view of the tire and wheel, showing the present invention in place and in dotted lines indicating the swinging movement of one element necessary to unlock the invention, and Figure 3 is an exploded view in perspective showing the three elements which comprise the present invention.

Referring in more detail to the drawings, in which like reference numerals indicate like parts throughout the several views, it will be seen that the invention as illustrated is a preferred embodiment intended to be used in that make of automobile above-described which has a single centrally disposed stud bolt and some sort of a plate, or uses a special stud bolt having means to engage the hub. While this embodiment is preferred, a modification is possible, as will be later explained, by which the present invention can be used in automobiles which provide one or more stud bolts to go through the holes in the hub plate, as above described.

In Figure 3 the device of the present invention is seen to consist of three elements: a stud bolt member 10 having its free end 11 flattened and provided with an elongated slot 12. Although in this embodiment shown the flattened free end 11 of the bolt member 10 is wider than the threaded end 13, it may be constructed with the same width so that the free end 11 will pass through a hole provided in a wheel hub to adapt this invention for use in the spare tire bracket presently providing stud bolts arranged to go through the hub holes.

A second element is a plate 14 here shown as flat and circular and having a slot 15 although other shapes may be more suitable, dished for instance or even annular if desired to fit over bolt member 10 modified to be used with the hub hole form of bracket.

A third element is a cam locking lever 16 which has one end 17 flattened and enlarged in width to form a generally tapering cam head 19, having a tongue 21 extending a distance outwardly from one side thereof at substantially a right angle to the handle portion 22 of the bar 16.

As will readily be understood from an examination of the drawing, especially Figure 2, the stud bolt member 10 replaces the usual stud bolt provided in the bracket 23 and is used in the threaded boss 24 as illustrated, being adjustably threaded therein to whatever length is desired to provide a snug fit of the wheel and tire in the well. The plate 14 fits over the flattened end 11 of the bolt member 10, and the lever 16 is hooked with the tongue 21 inserted into the slot 12 of the bolt member 10. A downward movement as indicated in the dotted lines in Figure 2 rotates the cam head 19 in contact against the plate 14 on each side of the slot 15 thereby tightening the plate 14 against the edges of the wheel hub 25 and pressing the wheel and tire 26 towards the bracket 23.

While only a single embodiment and preferred form of the present invention has been described and illustrated herein, many other embodiments are contemplated and many changes and modifications may be made without departing from the scope of the invention as defined in the appended claims.

What is claimed is:

1. In combination, a vehicle having a spare wheel well having opposed side walls, a bracket rising from said well along one of said side walls, a wheel positioned in said well, said wheel having a central portion provided with an opening, and a peripheral portion, said peripheral portion of the wheel being seated in said well and bearing at one side against the side wall remote from said bracket, the central portion of the wheel having one side facing said bracket and laterally spaced from said bracket, a plate on the other side of said wheel central portion and extending over the opening in said wheel central portion, a bolt having a threaded end portion threaded in said bracket and having another end portion extending through the opening of the central wheel portion and said plate, and a locking lever having a cam head connected with said other end portion of the bolt, said locking lever being rotatable to thread the bolt in and out of the bracket, said cam head having a cam lobe operatively engaged with the side of the central portion of the wheel remote from said one side thereof whereby said central portion of the wheel is tensioned toward and spaced from said bracket, so as to securably engage the said one side of the peripheral portion of the wheel with said remote side wall of the well.

2. In combination, a vehicle having a spare wheel well having opposed side walls, a bracket rising from said well along one of said side walls, a wheel positioned in said well, said wheel having a central portion provided with an opening, and a peripheral portion, said peripheral portion of the wheel being seated in said well and bearing at one side against the side wall remote from said bracket, the central portion of the wheel having one side facing said bracket and laterally spaced from said bracket, a bolt having a threaded end portion threaded in said bracket and having another end portion extending through the opening of the central wheel portion, and a locking lever having a cam head connected with said other end portion of the bolt, said locking lever being rotatable to thread the bolt in and out of the bracket, said cam head having a cam lobe operatively engaged with the side of the central portion of the wheel remote from said one side thereof whereby said central portion of the wheel is tensioned toward and spaced from said bracket, so as to securably engage the said one side of the peripheral portion of the wheel with said remote side wall of the well, and a plate engaged with said remote side of the central portion of the wheel, said lobe bearing directly upon said plate.

References Cited in the file of this patent
UNITED STATES PATENTS

| 228,697 | Thompson | June 8, 1880 |
| 2,640,036 | Dysarz | June 2, 1953 |